Patented May 27, 1952

2,598,407

UNITED STATES PATENT OFFICE 2,598,407

CROSS-LINKED POLYMERIC MATERIALS AND METHOD OF MAKING SAME

Carl S. Marvel, Urbana, Ill., assignor to E. I. du Pont de Nemours & Company, Wilmington, Del., a corporation of Delaware No Drawing. Application September 25, 1947, Serial No. 776,151

16 Claims. (Cl. 260—225)

This invention relates to polymeric materials and the method of making the same. More particularly, it relates to cross-linked polymeric materials and the method of making the same.

The term "polymeric materials," as used throughout this specification and the appended claims, is intended to designate a macromolecular organic compound containing a recurring unit or units, which units may be cyclic or acyclic in nature, and which are linked together within the compound in chain-like fashion. The compound may be a naturally occurring one or may be partly or wholly synthetic. Cellulose is an example of a naturally occurring polymeric material, while examples of partly or wholly synthetic polymeric materials include such surfaces as cellulose esters or ethers, the so-called addition polymers including such substances as polyvinyl alcohol and its derivatives, polyacrylic acids and their derivatives, and the so-called condensation polymers, including such substances as the polyesters and polyamides of polycarboxylic acids, synthetic resins and the like. Generally, polymeric materials of the type intended for use with this invention possess an average molecular weight in excess of 1000, and exist in the free state as solids at room temperature and atmospheric pressure.

An object of this invention is to provide new and improved cross-linked polymeric materials.

Another object of this invention is to provide cross-linked polymeric materials having improved properties.

An additional object of this invention is to provide a new and improved method of cross-linking polymeric materials.

Other and additional objects of the invention will become apparent hereinafter.

The objects of the invention are accomplished, in general, by reacting a polythiol or a mercaptide (metal salt) thereof with the active groups of a polymeric material.

The general nature of the cross-link will become apparent from the following illustrative equation showing the reaction between a polymer (R) containing an active chlorine group and ethanedithiol:

$$RCl + HSCH_2CH_2SH + RCl \rightarrow RSCH_2CH_2SR + 2HCl$$

In the event the polymer is sensitive to degradation by acid, it is advantageous to use in the process an acid acceptor, preferably in the form of a mildly basic salt, or to first form a salt of the dithiol.

The details and manner of practicing the invention will be apparent by reference to the following specific examples, it being understood that these examples are merely illustrative embodiments of the invention and that the scope of the invention is not limited thereto. Throughout the examples, the proportions are by weight.

Example I 10 parts of hydroxyethylcellulose acetate chloroacetate (0.14 hydroxyethyl, 2.65 acetyl, and 0.32 chloroacetyl groups per glucose unit) were dissolved in 90 parts acetone together with 0.2 part 1,3-mercapto-3,6-dioxaoctane. A film was cast from this solution and such film was heated. After heating at 220° C. for 5 minutes, the film was insoluble in but swelled 250% in acetone, and, after heating at 220° C. for 10 minutes, the swelling was reduced to 100%. When the film was heated at a temperature of 100° C., it was necessary to continue such heating for 48 hours in order to obtain the results secured.

When the film was heated at 220° C. for 10 minutes, the final films were not discolored or embrittled by the heat treatment. It did not break under light load (15 lbs. per square inch) below 300° C.

Example II 10 parts of hydroxyethylcellulose acetate chloroacetate (0.33 hydroxyethyl, 2.33 acetyl, and 0.47 chloroacetyl groups per glucose unit) were dissolved in 70 parts dry acetone. To this solution was added a solution of 0.3 part ethanedithiol and 0.6 part anhydrous sodium acetate in 3 parts acetic acid. Film was cast from the mixture and heated in an oven at 100° C. for 45 minutes. The film was swollen only 80% in 95% aqueous acetone and did not break under a load of 15 lbs. per square inch below 300° C. The odor of dithiol left the film while standing in the air overnight.

A control film, containing all of the above ingredients except the ethanedithiol, remained soluble and fusible after the heat treatment.

Example III

Yarn of cellulose acetate chloroacetate (2.44 acetyl and 0.31 chloroacetyl groups per glucose unit) was wound on a glass spool and placed in a nickel bomb tube which contained a shallow layer of talc and an amount of ethanedithiol equivalent to 0.05 mol per liter of unoccupied bomb space. This was an excess of dithiol in relation to the number of halogen groups in the yarn. The bomb was sealed and heated at 100° C. for 18 hours. The filaments were uncolored and retained their identity. Upon immersion in 95% aqueous acetone, they shrank longitudinally 14% but did not coalesce. The yarn did not stick to a heated metal block at elevated temperatures and did not break under light loads (15 lbs. per square inch) below 300° C.

*Example IV*

Sodium mercaptide of ethanedithiol was prepared by dissolving the dithiol in dry dioxane and adding a slight excess of metallic sodium. Any unreacted sodium was removed. To a 15% solution of cellulose acetate chloroacetate (2.44 acetyl and 0.31 chloroacetyl groups per glucose unit) in dry dioxane was added a 5% dioxane-solution of the sodium mercaptide in an amount just equivalent to the chlorine in the cellulose derivative. The solution was cast into film and dried at 100° C. for 1 hour. The washed film contained sulfur and was swollen only 45% by 95% aqueous acetone. It did not break below 300° C. under a load of 15 lbs. per square inch, and there was no odor of mercaptan in the washed film.

The hydroxyethylcellulose acetate chloroacetates employed in Examples I and II were prepared as disclosed in copending application Serial No. 774,443, filed Sept. 16, 1947, now U. S. Patent No. 2,539,920, issued January 30, 1951.

Hydroxyethylcellulose acetate chloroacetate is synthesized, in general, by acetylating hydroxyethylcellulose chloroacetate or by chloroacetylating hydroxyethylcellulose acetate. In either method a homogeneous or a heterogeneous reaction system may be used. To obtain preferred products the amounts of the various ester groups in hydroxyethylcellulose acetate chloroacetate are carefully selected.

The above-detailed examples illustrate certain embodiments of the invention wherein specific dithiols and a mercaptide (Example IV) are reacted with specific polymeric materials containing specific reactive groups, i. e. the halogen in the chloroacetate groups. The present invention, however, is not restricted to such specific polymeric materials, dithiols, and mercaptide.

The polymeric material can be any polymeric material, such as vinyl polymers, polyacrylic compounds, polymeric resins, cellulose derivatives, linear condensation polymers, for example synthetic resins, synthetic linear condensation polyamides, polyesters, polyethers and polyanhydrides and the like, provided only that the polymeric material contains a reactive or functional group. Illustrative examples of reactive groups which may be contained in the polymeric material are thiosyano groups, halogen esters, sulfate esters and sulfonate esters, for example, mono, di- or trichloroacetates, chlorketals, chloracetals, sulfates, alkyl or aryl sulfates, and alkyl, aralkyl or aryl sulfonates.

Illustrative polymers which can be used are polyvinyl chloroacetate; polyvinyl chloroacetyl; polyvinyl toluenesulfonate; polyvinyl sulfate; polyvinyl thiocyanoacetate; cellulose butanesulfonate; cellulose sulfate; cellulose acetate p-toluene sulfonate; cellulose acetate thiocyanoacetate; chlorinated rubber thiocyanated rubber; chlorinated polyethylene; polymers of β-chloroethylmethacrylate or copolymers with vinyl acetate, vinyl chloride, vinylidene chloride, styrene, acrylonitrile, etc.; co-polymers of vinyl chloroacetate or vinyl thiocyanoacetate with vinyl acetate, vinyl chloride, vinylidene chloride, styrene, acrylonitrile, etc.; chlorinated, brominated, or thiosyanated polyesters and polyamides containing as one constituent an unsaturated acid, such as maleic acid, fumaric acid, muconic acid, such as polyesters from ethylene glycol and a mixture of adipic acid and fumaric acid, polyesters from diethylene glycol and a mixture of sebacic acid and maleic acid, polyamides from muconic acid and hexamethylenediamine or decamethylenediamine; chlorinated or brominated vinyl chloride-diethyl fumarate co-polymers, chlorinated or brominated styrene-maleic anhydride co-polymer.

Any di- or polythiol or mercaptide thereof which is compatible with or can be impregnated into the polymer to be cross-linked can be used. The following are illustrative examples of polythiols which can be used as the cross-linking agents in this invention: ethanedithiol, 1,3-propanedithiol, 1,2,3-propanetrithiol, 1,4-dimercaptobutene-2,1,8-dimercapto-3,6-dioxaoctane, 1,5-dimercapto-3-oxapentane, 1,4-dimercaptomethylbenzene, 1,3-dimercaptomethylbenzene, 1,4-dimercaptomethylnaphthalene, 1,3,5-trimercaptomethylbenzene, tetramercaptomethylmethane, 1,2,3-trimercaptomethylpropane, 1,6-hexanedithiol, 1,10-decanedithiol, p-phenylenedithiol, m-phenylenedithiol, ethylene glycol thioglycolate glycerin thioglycolate, pentaerythritol thioglycolate.

As illustrative examples of mercaptides of di- or polythiols which can be used are the sodium, potassium, copper and zinc salts of any of the thiols disclosed in the preceding paragraph.

Because of the volatility and disagreeable odor of the lower molecular weight di- or polythiols, those of higher molecular weight are preferred. However, those of lower molecular weight can be used, as shown in Examples II and III, and the odor of unreacted mercaptan can be removed by solvent extraction, washing with soap solution, or mild oxidizing and bleaching treatments.

During the reaction an acid will be formed. In the event the polymer is sensitive to degradation by the acid formed in the reaction, an acid acceptor in the form of a mildly basic salt, such as sodium acetate, can be used. Instead of using a dithiol and an acid acceptor, as salt of the dithiol, such as an alkali metal mercaptide, can be used, in which case no acid will be formed in the reaction.

The temperature at which the reaction is carried out is determined largely by the stability and melting point of the polymer. Generally, and as shown in Example I, the lower the temperature the longer the time required to effect the reaction. For cross-linking cellulose esters containing active groups of the type mentioned hereinabove, the temperature at which the reaction is carried out is preferably between 70° C. and 180° C.

The proportions of the reactants can vary within limits. For optimum results, when the cross-linking agent is a relatively non-volatile dithiol, the dithiol should be present in an amount of 1 mol for each two reactive polymer groups to be used in the cross-links. When the cross-linking agent is a volatile dithiol, it should be used in an amount in excess of 1 mol of dithiol for each two reactive groups in order to compensate for any loss, or the reaction should be carried out under conditions wherein an atmosphere of the dithiol is provided and the optimum amount thereof can be absorbed by the polymeric material to be cross-linked.

The process of this invention makes possible the preparation of new cross-linked polymeric materials. As shown by Examples I and II, the cross-linking can be obtained in articles produced from a solution containing a common solvent for and in which the polymeric material and the cross-linking agent are compatible. However, as shown by Example III, the process can be conducted also as an after-treatment on a preformed polymeric article.

The invention is applicable for use in the production of or the after-treatment of any shaped structure, such as yarns, filaments, films, molded materials, etc., as well as coating compositions. The invention is also applicable to the cross-linking of a mixture of two or more different polymeric materials, each of which, however, contains an active group of the nature hereinbefore described. Such a mixture can be, for example, cellulose acetate chloroacetate and acetate toluenesulfonate.

In general, the products of the cross-linking treatment herein described remain clear and transparent, are only slightly colored at 260° C., are insoluble in organic solvents, and have increased softening temperatures. Although the cross-linking reduces the elongation to some degree, it does not produce brittleness.

The invention provides a simple and easy-control process for directly cross-linking polymeric materials. The cross-linked polymeric materials of this invention are insoluble in water and the common organic solvents and have improved thermal properties. The invention thus provides a simple, direct method for the direct transformation of a polymeric material in one that is insoluble in water and other organic solvents. The process does not give rise to the formation of undesirable by-products, the cross-linked polymeric product finally obtained being clear and substantially free of undesirable substances.

Since it is obvious that many changes and modifications can be made in the above-described details without departing from the nature and spirit of the invention, it is to be understood that the invention is not to be limited thereto except as set forth in the appended claims.

I claim:

1. Hydroxyethylcellulose acetate chloroacetate insolubilized by cross-linking the chloroacetate groups therein with a cross-linking agent selected from the class consisting of polythiols and mercaptides, the said insolubilized chloroacetate being insoluble in solvents for the unmodified chloroacetate.

2. Cellulose acetate chloroacetate insolubilized by cross-linking the chloroacetate groups therein with a cross-linking agent selected from the class consisting of polythiols and mercaptides, the said insolubilized chloroacetate being insoluble in solvents for the unmodified chloroacetate.

3. Hydroxyethylcellulose acetate chloroacetate insolubilized with a dithiol, the said insolubilized chloroacetate being insoluble in solvents for the unmodified chloroacetate.

4. Hydroxyethylcellulose acetate chloroacetate insolubilized with ethanedithiol, the said insolubilized chloroacetate being insoluble in solvents for the unmodified chloroacetate.

5. Hydroxyethylcellulose acetate chloroacetate insolubilized, with 1,8-mercapto-3,6-dioxaoctane, the said insolubilized chloroacetate being insoluble in solvents for the unmodified chloroacetate.

6. Cellulose acetate chloroacetate insolubilized with ethanedithiol, the said insolubilized chloroacetate being insoluble in solvents for the unmodified chloroacetate.

7. A method of insolubilizing hydroxyethylcellulose acetate chloroacetate, which comprises heating said chloroacetate with 1,8-mercapto-3,6-dioxaoctane at a temperature of from about 70° C. to about 220° C., thereby rendering the chloroacetate insoluble in solvents for the unmodified chloroacetate.

8. A method of insolubilizing hydroxyethylcellulose acetate chloroacetate, which comprises heating said chloroacetate with ethanedithiol at a temperature of from about 70° C. to about 220° C., thereby rendering the chloroacetate insoluble in solvents for the unmodified chloroacetate.

9. A method of insolubilizing cellulose acetate chloroacetate, which comprises heating said chloroacetate with sodium mercaptide of ethanedithiol at a temperature of from about 70° C. to about 220° C., thereby rendering the chloroacetate insoluble in solvents for the unmodified chloroacetate.

10. A method of insolubilizing a polymeric material comprising a cellulose acetate containing at least one reactive halogen ester group which comprises cross-linking said polymeric material with a cross-linking agent selected from the group consisting of polythiols and mercaptides, thereby rendering the materials insoluble in solvents for the unmodified materials.

11. An insolubilized material derived from a polymeric material comprising a cellulose acetate containing at least one reactive halogen ester group by cross-linking said polymeric material with a cross-linking agent selected from the class consisting of polythiols and mercaptides, said insolubilized material being insoluble in solvents for the unmodified material.

12. A method as set forth in claim 10, wherein the polymeric material containing the reactive group is hydroxyethylcellulose acetate chloroacetate.

13. A method as set forth in claim 10, wherein the polymeric material containing the reactive group is cellulose acetate chloroacetate.

14. A method as set forth in claim 10, wherein the cross-linking agent is a dithiol.

15. A method as set forth in claim 10, wherein the cross-linking agent is a dithiol and a basic, acid-binding material is used.

16. A method as set forth in claim 10, wherein the cross-linking agent is an alkali metal salt of a dithiol.

CARL S. MARVEL.

REFERENCES CITED

The following references are of record in the file of this patent:

UNITED STATES PATENTS

| Number | Name | Date |
|---|---|---|
| 2,411,954 | Burke | Dec. 3, 1946 |
| 2,418,939 | Izard | Apr. 15, 1947 |
| 2,418,942 | Morgan | Apr. 15, 1947 |
| 2,512,960 | Morgan | June 27, 1950 |